United States Patent [19]

Stehl

[11] 3,962,024

[45] June 8, 1976

[54] APPARATUS FOR LAMINATING INSULATING WINDOW PANES OR THE LIKE

[75] Inventor: Otto Stehl, Essen-Bredeney, Germany

[73] Assignee: Flachglas Aktiengesellschaft Delog-Detag, Gelsenkirchen, Germany

[22] Filed: Sept. 3, 1974

[21] Appl. No.: 502,379

[30] Foreign Application Priority Data

Sept. 4, 1973 Germany ............ 2344461

[52] U.S. Cl. ............ 156/539; 156/107

[51] Int. Cl.$^{2}$ ............ B32B 31/00

[58] Field of Search ............ 156/106, 107, 109, 580, 156/556, 557, 562, 566, 538, 539, 356, 357, 578; 161/45, 44; 65/58; 198/19, 75, 85; 118/216, 220, 236

[56] References Cited

UNITED STATES PATENTS

| | | | |
|---|---|---|---|
| 3,202,494 | 8/1965 | Woods et al. | 65/58 |
| 3,205,056 | 9/1965 | Roetter et al. | 156/556 X |
| 3,389,033 | 6/1968 | Ullman | 161/44 UX |
| 3,473,988 | 10/1969 | Rullier et al. | 161/45 X |
| 3,543,385 | 12/1970 | Javaux | 65/58 X |
| 3,822,172 | 7/1974 | Rullier | 156/109 X |

*Primary Examiner*—William A Powell
*Assistant Examiner*—David A. Simmons
*Attorney, Agent, or Firm*—Karl F. Ross; Herbert Dubno

[57] ABSTRACT

A stack of rectangular workpieces to be peripherally bonded to one another, such as a unit of two glass plates and an interposed spacer frame, is transported along a generally U-shaped horizontal path having two parallel runs and one transverse course constituted by a number of active or passive conveyor stages. A pair of power presses with complementarily oriented L-shaped jaws are inserted in the two runs, each press acting upon the leading and proximal edges of the stack. A control station common to the two runs is inserted between the two presses and carries an adhesive injector having a nozzle head alternately trainable upon a stack on one or the other press. A conveyor stage in each run, immediately downstream of the respective press, is bodily shiftable between that press and an adjoining stage to give the adhesive injector at the control station access to the press side clamping the leading edge of the stack.

8 Claims, 2 Drawing Figures

APPARATUS FOR LAMINATING INSULATING WINDOW PANES OR THE LIKE

FIELD OF THE INVENTION

My present invention relates to an apparatus for bonding together the edges of a stack of rectangular workpieces in the production of laminated units such as thermally insulating window panes.

BACKGROUND OF THE INVENTION

In the production of such insulating window panes of a rectangular outline, at least two registering glass plates are stacked with interposition of a spacer frame running around the edges of these plates. To form an integral unit, with the space between the plates hermetically sealed against the atmosphere, it is conventional practice to apply an adhesive to the edges of the stack so as to bond the plates and the spacer frame rigidly to one another. After edgewise injection of the adhesive between the glass plates and the spacer frame, the stack is compressed with or without heating so as to activate the adhesive and distribute it uniformly over the surfaces to be bonded. Since the dimensions of the plates may vary considerably, it has been found advantageous to clamp the stack in two steps between a first and a second pair of L-shaped press jaws with legs long enough to accommodate the largest plates contemplated. In these clamping steps the jaws are complementarily oriented, each pair of jaws clamping two adjoining stack edges while the adhesive is being applied thereto.

If the two presses are inserted in a straight-line transport path, two separate control stations are required to monitor these edge-sealing operations and to handle the respective adhesive injectors which are trained upon the stacks about to be clamped in the two presses. Heavy-duty synthetic-resin adhesives generally used in such processes, e.g. two-component epoxy resins, are sensitive to excessive delays or improper handling so that skilled personnel must man the two stations.

Such a duplication of control stations and of adhesive-injection devices adds considerably to the production cost of insulating window panes or similar units produced in this manner. Moreover, the operator or operators at each station are idle much of the time, as during the curing of the injected adhesive in the closed press.

OBJECT OF THE INVENTION

It is, therefore, the object of my present invention to provide an improved apparatus for sealing the edges of a workpiece stack, in the the production of insulating window panes or the like, with avoidance of the afore-stated.

SUMMARY OF THE INVENTION

An apparatus according to my present invention includes intermittently operable transport means defining a generally U-shaped horizontal path for the stack to be laminated, this path having two substantially parallel runs interconnected at one end by a transverse course. The transport means comprises a plurality of conveyor stages, including a loading stage at the free end of the first run (as seen in the transport direction) and an unloading stage at the free end of the second run, a pair of clamping presses with L-shaped pairs of jaws being respectively inserted in these runs for clamping together a first and a second pair of edges of the stack. The two presses are substantially aligned with each other, a common control station between the two runs having access to both presses.

Thus, in accordance with the present invention, only a single control station need be provided so that a single operator or operating crew can be employed to take care of the two presses. In this manner the cost per laminated unit is considerably reduced.

In accordance with yet another feature of my invention, the control station is provided with applicator means such as an adhesive injector displaceable along both runs of the transport path as well as transversely thereto, a conveyor stage adjacent each press being bodily shiftable in the longitudinal direction to provide the necessary distance during the bonding operation.

The provision of only a single adhesive injector for both presses eliminates many of the difficulties encountered when such an injector must remain idle for longer periods of time. Thus even relatively fast-setting epoxy adhesives can be employed without danger of premature hardening in the injection nozzle which would require production to be stopped while the blockage is cleared.

BRIEF DESCRIPTION OF THE DRAWING

The above and other features of my invention will become more readily apparent from the following detailed description, reference being made to the accompanying drawing in which.

SPECIFIC DESCRIPTION

Figure 2:
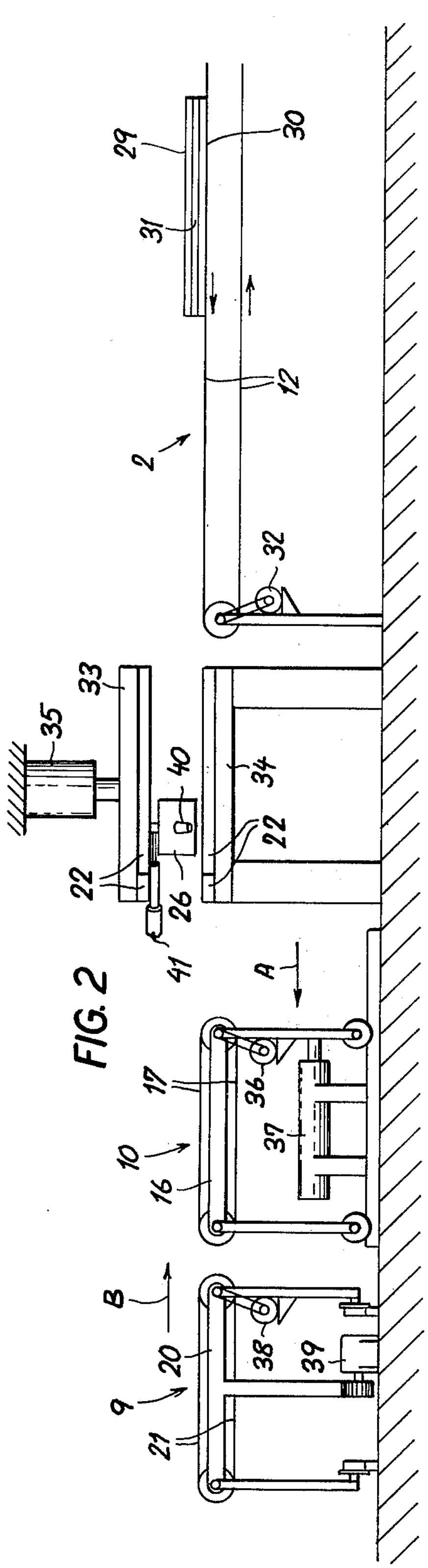
FIG. 2 is a side view of the apparatus of FIG. 1.
Figure 1:
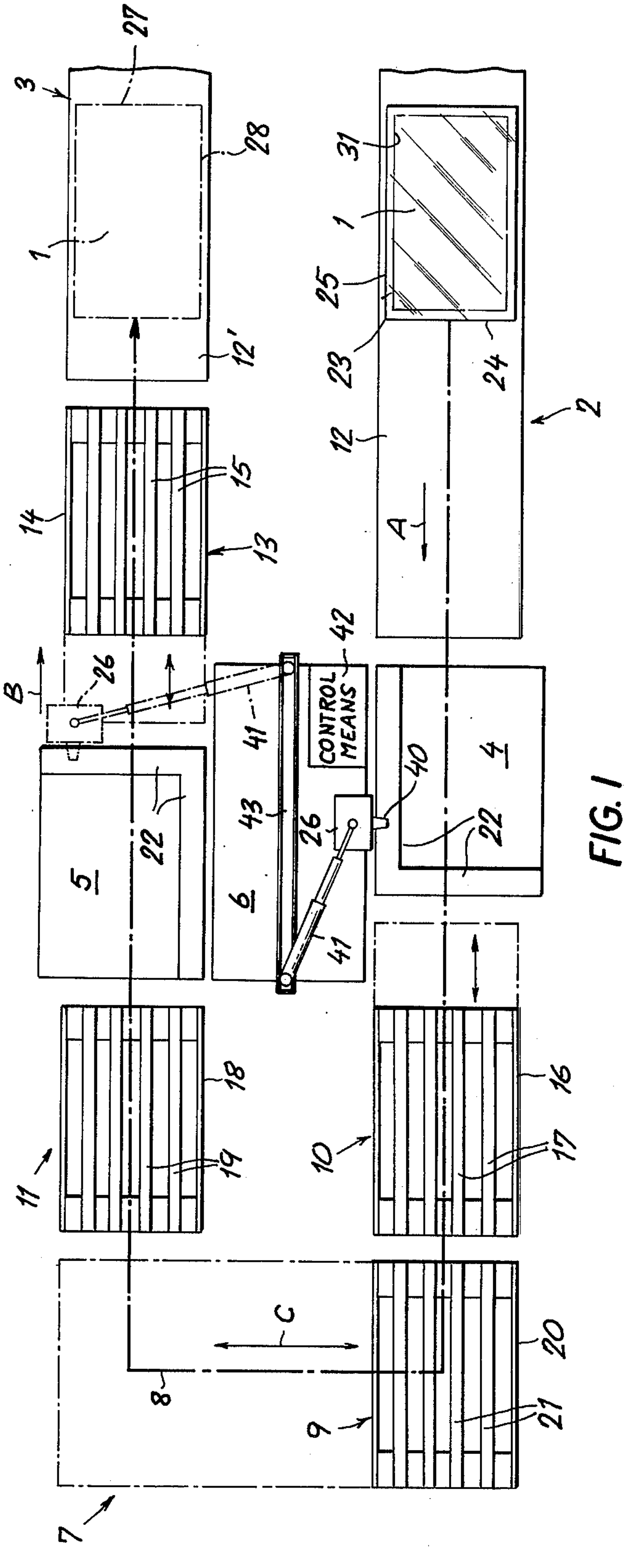
FIG. 1 is a largely diagrammatic top view of a laminating apparatus embodying my present invention.

As shown in FIGS. 1 and 2, an apparatus according to the present invention operates on a workpiece stack 1 comprising an upper glass plate 29, a lower glass plate 30, and an interposed spacer frame 31. This stack is intermittently conveyed, over a horizontal transport path indicated by a dot-dash line 8, by a number of active or passive conveyor stages including a loading stage 2, driven by a motor 32 (FIG. 2), and a similar unloading stage 3.

Loading stage 2 feeds the oncoming stacks to a first power press 4 followed by a discharge conveyor 10 which moves the partly bonded stack 1 onto a transfer table 9. From there the stack is passed onto a feeding conveyor 11 serving a second power press 5 whence it is removed by a further discharge conveyor 13 for delivery to unloading stage 3.

The press 4 comprises an upper platen 33 and a lower platen 34. Each of these platens is provided with an L-shaped jaw 22 whose orthogonally adjoining legs extend along the inner longitudinal and downstream transverse edges of the press platens 4. These legs are so dimensioned as to accommodate the largest workpieces to be pressed. A heavy-duty hydraulic cylinder 35 serves for the vertical reciprocation of the upper, movable platen 33 relative to the fixed lower platen 34. The press 5 is of identical construction.

Loading stage 2 and unloading stage 3 comprise endless broad-band conveyor belts 12, 12′ driven in opposite directions to transport the stack 1 first from right to left (arrows A) and then from left to right (arrows B).

The first discharge stage 10 comprises a conveyor pallet 16 having a plurality of endless belts 17 driven by a motor 36. The entire pallet 16 ccan be reciprocated back and forth in directions A and B by means of a penumatic cylinder 37 located under the belts 17 and operated from a central control station 6. This station is located directly between the presses 4 and 5 which confront each other with a slight longitudinal offset.

The reversible transfer stage 9 comprises another conveyor pallet 20 having a plurality of belts 21 driven by a motor 38. Another motor 39 underneath these belts is operated from the control station 6 and serves to reciprocate the pallet 20 in the direction indicated by arrow C, i.e. at right angles to the directions A and B. The stack 1 retains its original orientation from the beginning to the end of its travel.

The feeding stage 11 for press 5 comprises a fixedly positioned conveyor 18 with endless belts 19 which preferably are also driven by a motor not shown.

The second discharge stage 13 downstream of press 5 comprises a conveyor pallet 14, having belts 15, substantially identical with the pallet 16 of stage 10.

The control station 6 is provided with an adhesive injector 26 having a nozzle 40. Nozzle head 26 is suspended from a swingable arm 41 whose pivot is longitudinally shiftable, with the aid of control means 42, on a track 43 so as to allow the nozzle 40 to be displaced anywhere along the proximal longitudinal and transverse leading edges of the platens of both presses 4 and 5, i.e. along the legs of their jaws 22. The shiftability of conveyor stages 10 and 13 facilitates the sweeping of the downstream edges as illustrated in platon lines for the press 5.

Control means 42 at the station 6 may also be used to activate the various drive motors of the several conveyor stages, as well as the valves for opening and closing the presses 4 and 5, either manually or automatically according to a predetermined program.

While one stack is being clamped and cured in one press, the operator at station 6 may verify the proper positioning of a second stack in the other press preparatorily to closure thereof. In this way, the operator's time is utilized most efficiently.

If all the conveyor stages are of the passive type, the stack 1 may be moved by hand over its transport path 8; in this instance, too, its orientation will remain unchanged throughout its travel.

I claim:

1. An apparatus for bonding together the edges of a stack of rectangular workpieces in the production of a laminated unit, comprising:

intermittently operable transport means defining a generally U-shaped horizontal path for said stack with a first run, a second run substantially parallel to said first run and a transverse course interconnecting said runs at one end thereof, said transport means including a loading stage at an end of said first run opposite said transverse course and an unloading stage at an end of said second run opposite said transverse course;

a first press in said first run for clamping together a first pair of adjoining edges of said stack;

a second press in said second run for clamping together a second pair of adjoining edges of said stack, said presses being substantially aligned with each other; and a common control station between said runs having access to both said presses, said control station including applicator means for a bonding agent to be spread onto said adjoining edges.

2. The apparatus defined in claim 1 wherein said transport means includes a plurality of conveyor stages in each run upstream and downstream of the respective press, at least one conveyor stage in each run being bodily shiftable between the respective press and an adjoining stage to give access to a side of the press.

3. The apparatus defined in claim 2 wherein said shiftable conveyor stage is located immediately downstream of the respective press.

4. The apparatus defined in claim 1 wherein said applicator means comprises an adhesive injector.

5. The apparatus defined in claim 4 wherein said injector has a nozzle head alternately orientable toward each of said presses.

6. The apparatus defined in claim 1 wherein said platens are positioned for engagement of a leading edge of said stack and an edge thereof proximal to said station.

7. The apparatus defined in claim 1 wherein each of said presses is provided with a pair of L-shaped jaws for clamping said adjoining edges therebetween, said applicator means being displaceable along said runs and transversely thereto for spreading said bonding agent onto said adjoining edges.

8. The apparatus defined in claim 7 wherein said transport means includes a longitudinally shiftable conveyor stage in each run adjacent the respective press giving access to a transverse edge of a stack held between said jaws.

* * * * *